United States Patent [19]

Ivers

[11] Patent Number: 4,921,272
[45] Date of Patent: May 1, 1990

[54] SEMI-ACTIVE DAMPER VALVE MEANS WITH ELECTROMAGNETICALLY MOVABLE DISCS IN THE PISTON

[75] Inventor: Douglas E. Ivers, Cary, N.C.
[73] Assignee: Lord Corporation, Erie, Pa.
[21] Appl. No.: 310,145
[22] Filed: Feb. 10, 1989
[51] Int. Cl.$^5$ .............................................. B60G 17/04
[52] U.S. Cl. .................................... 280/707; 280/804; 180/41
[58] Field of Search .................. 280/804, 707; 180/41; 188/280, 299

[56] References Cited

U.S. PATENT DOCUMENTS

| | | | |
|---|---|---|---|
| 2,235,488 | 3/1941 | Mercier | 188/88 |
| 3,321,210 | 5/1967 | Delchev | 280/6 |
| 3,420,341 | 1/1969 | Keehn, II | 188/88 |
| 3,807,678 | 4/1974 | Karnopp et al. | 248/358 R |
| 3,826,343 | 7/1974 | Heymann | 188/282 |
| 3,995,883 | 12/1976 | Glaze | 280/707 |
| 4,034,860 | 7/1977 | Leppich | 188/282 |
| 4,468,050 | 8/1984 | Woods et al. | 280/707 |
| 4,468,739 | 8/1984 | Woods et al. | 364/424 |
| 4,491,207 | 1/1985 | Boonchanta et al. | 188/299 |
| 4,530,425 | 7/1985 | Veaux et al. | 188/299 |
| 4,620,619 | 11/1986 | Emura et al. | 188/319 |
| 4,635,765 | 1/1987 | Schmidt | 188/299 |
| 4,660,686 | 4/1987 | Münning et al. | 188/280 |
| 4,696,489 | 9/1987 | Fujishiro et al. | 280/707 |
| 4,742,998 | 5/1988 | Schubert | 267/136 |
| 4,743,300 | 5/1988 | Karnopp | 267/218 |
| 4,756,549 | 7/1988 | Kurosawa et al. | 280/707 |
| 4,770,438 | 9/1988 | Sugasawa et al. | 280/707 |
| 4,786,034 | 11/1988 | Heess et al. | 267/64.15 |
| 4,804,203 | 2/1989 | Glab et al. | 280/707 |
| 4,815,575 | 3/1989 | Murty | 280/707 |

FOREIGN PATENT DOCUMENTS 1336186 7/1963 France .
1188453 4/1970 France .
2164120 3/1986 United Kingdom .

OTHER PUBLICATIONS

Crosby et al., Vibration Control Using Semi-Active Force Generators, Transaction of the ASME Paper No. 73-DET-122.
Margolis et al., Heave Mode Dynamics of a Tracked Air Cushion Vehicle with Semiactive Airbag Secondary Suspension, Jounal of Dynamic Systems Measurement and Control, Dec. 1975, pp. 399-407.
Margolis, Semi-Active Control of Wheel Hop in Ground Vehicles, Vehicle System Dynamics, 1983, pp. 317-330.
Krasnicki, The Experimental Performance of an "On-Off" Active Damper, Lord Corporation Technical Article, Circa 1981.
Hrovat et al., An Experimental Comparison Between Semiactive and Passive Suspensions for Air-Cushion Vehicles, Int. J. of Vehicle Design, 1981.
Lord Corporation Semi-Active Suspensions, Lord Corporation Technical Article.
Margolis, The Chatter of Semi-Active On-Off Suspensions and its Cure, Vehicle System Dynamics, vol. 13, 1984.

Primary Examiner—Richard A. Bertsch
Attorney, Agent, or Firm—Bell, Seltzer, Park & Gibson

[57] ABSTRACT

An improved method and means for control and accomplishment of semi-active damper means transition between high damping and low damping states is provided which takes advantage of the available inherent dynamic fluid pressure forces produced by the condition of motion between supported and supporting members. Deferral or delay of damper state transitions to avoid force discontinuities or system noise is accomplished mechanically, or automatically internal to the structure of the adjustable valve means. The delay of damper state transition from high to low and low to high damping is accomplished independent of the particular control policy utilized until the fluid pressure differential across the valve ring members is a preselected low value. Commanded valve switching and motion condition sensing requirements are also minimized by reversible check valve means. Damper state transitions normally required based on a sign change in relative velocity are accomplished without actuated change in valve ring position by one of the inner and outer valve rings (in the "off" state) which floats between flow permitting and flow restricting positions dependent upon the direction of fluid flow through the piston.

12 Claims, 5 Drawing Sheets

Fig. 8(a) Extension Outer Magnets On

Fig. 8(b) Compression Outer Magnets On

Fig. 9

SEMI-ACTIVE DAMPER VALVE MEANS WITH ELECTROMAGNETICALLY MOVABLE DISCS IN THE PISTON

FIELD OF THE INVENTION

The invention relates generally to fluid damper assemblies used in vehicle suspensions and other mounting systems for attenuation of shock and vibratory forces between relatively movable members, interconnected by semi-active damper means rapidly switchable in accordance with a preselected control policy between high damping and low damping states, wherein the damping coefficient of the damper means is respectively relatively high and relatively low. More specifically, the invention relates to an improved method and means for the control and accomplishment of damper means transition between high damping and low damping states which takes advantage of the available inherent dynamic fluid pressure forces of the system, to minimize control signal conditioning requirements and substantially reduce undesirable shock impulses or noise which at times may be generated by switching of the semi-active damper between damping states.

BACKGROUND OF THE INVENTION

The design and construction of vibration isolators, absorbers, and damping treatments has led to important advancements in vehicle suspension technology and other applied fields. Traditionally, vibration control is achieved using passive elements such as springs, dampers and masses in the form of metallic, pneumatic, hydraulic or rubber devices. These elements are considered "passive" in the sense that no power source is required for their effective operation, i.e., the vibration control elements only store or dissipate the energy associated with the vibratory motion. As a practical matter, numerous vibration problems can be solved using inexpensive, reliable passive devices; however, distinct performance limitations are inherent when only passive devices are used, which may be unacceptable for more sophisticated applications. Attempts at improving these vibration control devices have included the provision of adjustable parameters which could be varied to suit changing excitation or response characteristics of the particular system. For example, automobiles have utilized manually adjustable shock absobers. More recently, modern vehicle suspensions and isolation systems have incorporated more elaborate devices such as automatic leveling systems to adjust static deflection as the suspension load varies. However, the most notable shortcoming of any such passive device is that in addition to failing to provide sufficient damping force during certain instances of dynamic response, damping forces may at other times tend to amplify, rather than attenuate the transmission of energy to produce an undesirable effect.

Fully active dampers or systems have been created which utilize high pressure pumps, high performance servo-mechanisms or other external energy source to vary vibration control system parameters. With the advent of optimization in control theory and development of an understanding of the dynamics of such systems using these devices, fully active systems have been constructed for a wide variety of applications which include vehicle suspensions, helicopter rotor isolation, flexible aerospace vehicle bending mode control and the isolation of pilots from aircraft motion. Although fully active vibration control systems can achieve excellent performance, their expense, complexity, bulk and unreliability may have, in many instances, made them commercially unsuitable for many applications.

Semi-active systems have been created in which much of active system performance gains are relized without the attendant complexity, cost and external power or drive requirements, which are further clearly superior to previous adjustable or static passive systems. Semi-active dampers utilize no hydraulic pump or large external drive means, yet in contrast to purely passive systems, are rapidly switchable between damping states to vary the damping coefficient. According to the particular control policy utilized to drive a semi-active damper, attenuation of the transmission of energy between movable members can be achieved which approaches that realized in fully active systems. Semi-active dampers, and in some instances control policies for them, are disclosed in U.S. Pat. Nos. 3,807,678; 3,995,883; 4,468,050; 4,468,739; 4,491,207; 4,696,489 and 4,742,998; and also in U.S. patent application Ser. Nos. 913,067 filed Sept. 29, 1986, and 945,380 filed Dec. 22, 1986, both owned by the assignee of the present application. The disclosures of the aforesaid patents and applications are incorporated herein by reference.

In certain applications, operation of real time semi-active damping systems which produce relatively abrupt changes in damping coefficient under normal working conditions can result in the generation of undesirable impulses or shock forces that lead to unwanted system stress and noise. This shock or noise generation problem may, in certain instances, be eliminated by reducing the differential between the damping coefficient high and low states, but this may degrade performance of the damper to an unacceptable extent. Other possible solutions include electronically conditioning the control signals imparted to the flow-controlling valve means of the damper to cause it to operate more slowly, or to delay its effecting switching of the damper status until the relative velocity between the members interconnected by the damper, and thus "across" the damper itself, is at a selected low value. However, for the operation of semi-active damping systems in certain environments, more reliable and cost effective performance is better achieved by decreasing rather than increasing reliance upon electronic system monitoring or control devices. Commercially competitive systems might seek to minimize the sensing of system motion parameters and the frequency of valve commands.

Another characteristic of semi-active systems, especially in vehicle applications, is the repeated, rapid transition of the actuated valving elements required to appropriately modulate the damping coefficient. In such cases, damper switching takes place to a large degree based on changes in the sign of the relative velocity between vehicle body and frame components. For control policies based at least in part upon this relative velocity parameter, commanded valve switches due to a relative velocity sign change are necessitated with a much higher degree of frequency than valve switches dependent upon other system motion conditions. In addition to system fatigue and wear which can be associated with the valve elements laboring under multiple switching commands, motion sensing and signal conditioning requirements for these control policies or modifications to them can augment the cost and unreliability of such systems.

It is accordingly an object of the present invention to provide a semi-active damper means which eliminates or substantially minimizes the above mentioned and other problems and limitations typically associated with semi-active devices of conventional construction and operation.

SUMMARY OF THE INVENTION

With the foregoing in mind, the present invention provides a method and means for the control and accomplishment of damping coefficient modulation in a semi-active damper which is implemented automatically and internally to the valve means structure. The improved valve means effectively reduces motion condition sensing and signal processing requirements, while also minimizing component fatigue and wear which can be associated with repeated switching and harsh applications. Damping state transitions that are required based on a sign change in relative velocity between the supported and supporting members are effected automatically by pressure actuated valve means of the invention without the need for an electromagnetically actuated valve switch. Further, undesirable noise and/or shock forces which can be experienced by the system and are usually produced by force discontinuities or abrupt changes in damping state at relatively high relative velocities between the movable members are eliminated or substantially reduced.

Dynamic fluid pressure forces within the valve inherently produced by system motion are utilized to defer or delay switching of the valve means from the high damping to the low damping and low damping to high damping states, even against a commanded valve actuation, until the relative velocity between the members is at a preselected low value. In this manner, the damping state transition is delayed to assuage the abrupt force discontinuities which might otherwise adversely affect system performance.

In carrying out principles of the present invention, in accordance with an embodiment thereof, an adjustable valve means is provided within the piston of a damper assembly interconnecting supported and supporting members. The supported and supporting members may, for example, be the body and frame components of a vehicle such that the primary function of the system would customarily be to isolate the supported member insofar as possible from vibration and shock forces transmitted thereto. The system is semi-active and may be operated pursuant to any suitable control policy for regulating or modulating the damping coefficient of the damper means. The valve means includes inner and outer valve rings concentrically spaced and movable between flow restricting and flow permitting positions within concentrically spaced annular channels. The annular channels are connected by an annular flow region therebetween. Actuation of the inner and outer valve rings between their first and second positions is accomplished respectively by a plurality of inner and outer electromagnets, embedded within the piston in proximity to the valve rings. The electromagnets are actuated by the control means of the system.

The efficiency of the damper means is greatly improved by the reversible check valve function of the inner and outer valve ring members. When either one of the plurality of inner or outer electromagnets is in the "off" state, its corresponding inner or outer valve ring member is free to "float" between its flow restricting and flow permitting positions depending upon the direction of fluid flow through the piston. When, for example, the floating inner or outer valve ring member is in its flow restricting position during extension, upon change in flow direction (caused by movement of the supported and supporting members in compression), the valve ring member will then assume its flow permitting position because of the fluid pressure forces acting upon it. The valve ring members will therefor cooperate to automatically produce a damping state change (either low to high or high to low) upon change in sign of relative velocity between the supported and supporting members automatically without an electronically commanded valve switch.

The deferral or delay of damper state switching from high to low damping and low to high damping is provided by fluid pressure forces acting on the inner and outer ring members which may at times oppose the electronically commanded actuation forces. These fluid pressure forces may at times oppose the electronically commanded actuation forces and thus cause a delay in switching from high to low damping until the fluid pressure differential (and hence relative velocity across the damper) is at a preselected low value. Deferral or delay from low damping to high damping is provided by pressure forces that act on either of the inner or outer valve ring members when in their floating or "off" state to retain them in their flow permitting positions.

BRIEF DESCRIPTION OF THE DRAWINGS

For a better understanding of the invention, reference may be made to the following description of exemplary embodiments, taken in conjunction with the figures of the accompanying drawings, in which:

FIGS. 8(*a*)–8(*b*) are fragmented, somewhat schematic radial half-section view of the adjustable valve means of FIG. 4, showing the inner and outer valve ring functions during extension and compression conditions of motion; and, FIG. 9 is a schematic and graphical representation of the adjustable valve means of the present invention showing the relationship between fluid pressure and position within the piston.

DESCRIPTION OF THE PREFERRED EMBODIMENTS

Figure 1:
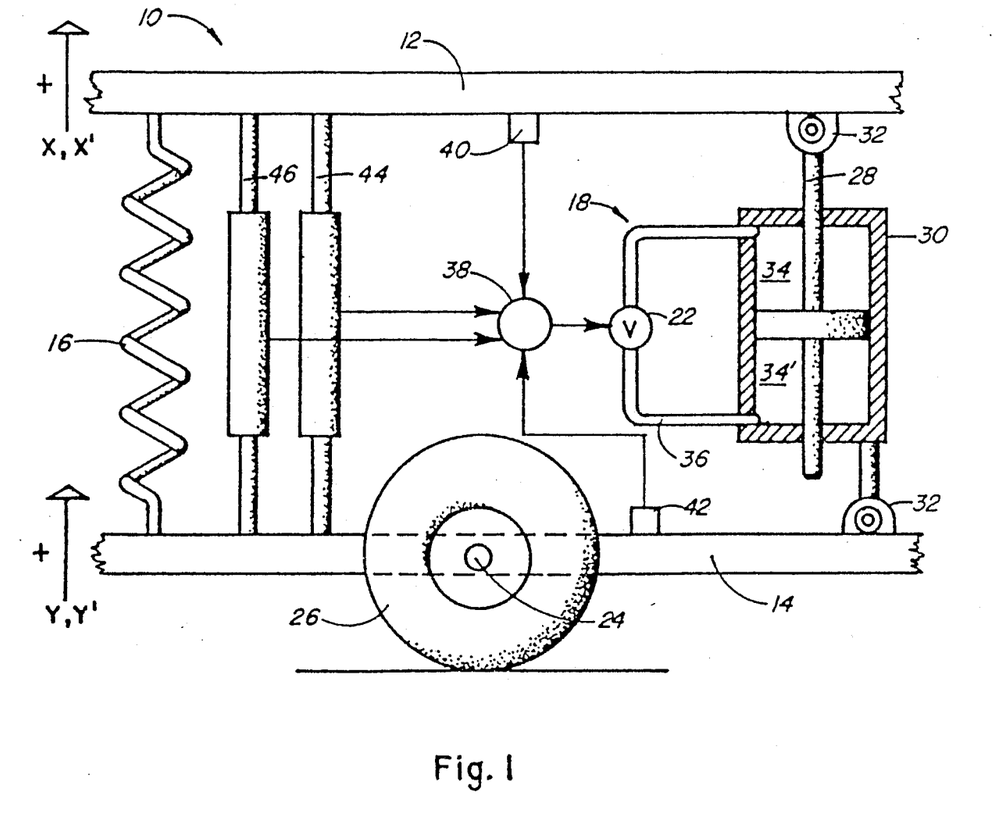
FIG. 1 is a schematic view of a force attenuating suspension or similar mounting system having semi-active damper means controllable in accordance with and suitable for practice of the invention.

Referring now to FIG. 1, there is depicted the semi-active damping assembly 10 of the present invention. A two degree of freedom, suspension or similar force-attenuating system is shown for interconnecting vertically spaced and relatively movable supported and supporting members 12 and 14, respectively. It is contemplated that members 12 and 14, for exemplary purposes, may be the body and frame components of an automobile or other vehicle (not shown) such that the primary function of system 10 would customarily be to isolate supported member 12 insofar as possible from the vibratory and/or shock forces transmitted to member 14 by road surface irregularities, engine firing disturbances and other force impulses. For purposes of describing the motion condition of assembly 10, designations X, $X_1$ respectively define the vertical displacement and the absolute velocity of supported member 12, it being arbitrarily indicated that these are positive when in an upward direction and thus are negitive when in a downward direction. The same sign convention and the letters Y, $Y_1$ similarly designate the vertical displacement and absolute velocity of supporting member 14. It is understood that when system 10 is at rest, X, $X_1$, Y and $Y_1$ are all zero.

The supported and supporting members 12 and 14 of system 10 are interconnected by compression spring means 16 and semi-active damper means 18. As shown schematically in FIG. 1, semi-active damper means 18 includes a damper assembly 20 of the hydraulic piston and cylinder type, in which the damping coefficient is variably controlled by fluid circuitry that includes an adjustable valve means 22 and is subsequently described in detail. Supporting member 14 for moving vehicle applications may also be connected to an axle 24 and tire 26. While only a single spring/damper set is shown, a plurality may be, and normally is, provided in the typical vehicle suspension system. Damper assembly 20 is illustratively of the hydraulic piston and cylinder type, such that the rod 28 and cylinder 30 are secured to respective ones of the supported and supporting members 12, 14 by suitable connectors 32. Relative vertical movement between members 12 and 14 displaces hydraulic fluid between variable volume chambers 34 and 34' of damper 20 via the electronically or otherwise rapidly adjustable valve means forming part of a hydraulic circuit 36 interconnecting such chambers. As will be discussed, valve means 22 and thus hydraulic circuit 36 are preferably incorporated within the piston head separating chambers 34 and 34'.

Adjustable valve means 22 is rapidly switchable between at least two different operating conditions. In one of these operating conditions to be designated as "high" damping, valve means 22 significantly throttles or restricts the flow of hydraulic fluid through fluid circuit 36. This causes the damping coefficient of the semi-active damper means 18 to be relatively large. In the other one of its operating conditions, valve means 22 permits relatively free flow of hydraulic fluid through hydraulic circuit 36 and thus between cylinder chambers 34 and 34'. At such times, designated as "low" damping, the damping coefficient of semi-active damper means 18 is at a preselected relatively small magnitude, which may even approach an approximation of zero damping, according to the particular system requirements.

Switching of valve means 22 between high and low conditions, and therefore the switching of semi-active damper means 18 between relatively high and low damping states, is normally produced by suitable electronic control means 38 operable responsive to a preprogrammed control policy and to input data received from preselected ones of a plurality of motion sensors 40, 42, 44 and 46. As will be subsequently described in detail, operation of semi-active damper means 18 between high damping and low damping states may also be assisted or accomplished by mechanical valve arrangements in addition to electronic control means 38. Sensors 40 and 42 respectively detect accelerations of supported and supporting members 12 and 14, which acceleration signals can be utilized by such sensors and/or by control means 38 to derive displacement, absolute velocity and/or relatively velocity data. Sensors 44, 46 directly detect relative displacements and relative velocities of members 12, 14. It will be appreciated that not all of the illustrated sensors need be employed or provided in association with system 10. It may, in some instances, further be determined inefficient to derive all of the necessary data for input to control means 38, in which case mechanical means incorporated within adjustable valve means 22 may be utilized to obviate signal conditioning input pertaining to relative displacement changes or relative velocity between the supported and supporting members 12 and 14.

Proscribed semi-active damper performance of assembly 10 may be implemented by any appropriate semi-active damper control policy through control means 38. For purposes of illustration, one "standard" control policy, which is disclosed in U.S. Pat. Nos. 3,807,678, 3,491,207 and 4,696,409, is based upon the sign of the product of the relative velocity between the supported and supporting members times the absolute velocity of the supported member. More specifically, the aforesaid control policy dictates that the state of the semi-active damper be high when $X_1(X_1-Y_1)>0$, i.e., when the sign of the aforesaid product is positive or plus; and that the damper's damping state when $X_1(X_1-Y_1)<0$, i.e., when the product sign is negative. In its implementation of this control policy, control means 38 may obtain the necessary data with respect to relative velocity from selected ones of sensors 40, 42, 44, 46, or the need for such relative velocity data may be minimized or eliminated altogether, as will be discussed. Other control policies may be utilized as well as, for example, those which operate dependent upon the sign of the product of the relative velocity of the supported and supporting members times the relative displacement of such members. For purposes of the invention, it is not deemed relevant what particular control policy is utilized, provided that for discussion purposes selecting the damper state is dependent at least in part upon the relative velocity between the supported and supporting members.

One problem which can be associated with operation of semi-active damper assembly 10 where the damper means 18 is rapidly and repeatedly switched between high damping and low damping states is the generation of force impulses or shock forces which may, in certain utilizations of assembly 10, create stresses and/or noise of objectionable magnitude. These characteristics may be apparent when the damper assembly is operated, for example, under the standard control policy previously discussed in which switching of the damper assembly from one to the other of its damping states is effected substantially immediately, i.e., without any intentional delay, whenever the control policy dictates that a change in the damping state of the damper means should be made.

Figure 2:
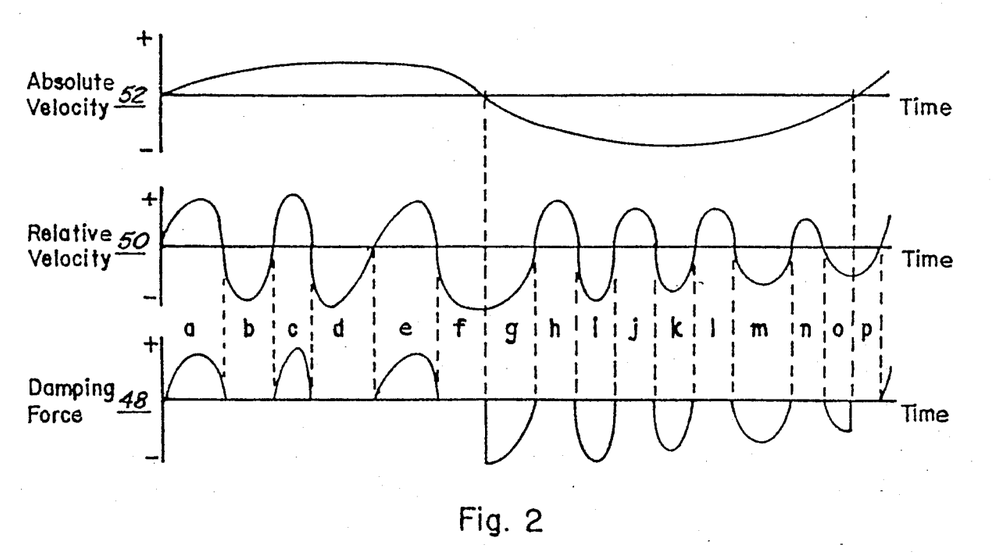
FIG. 2 is a simplified graphic illustration of the relationship between velocities and damper forces of a semi-active damper means controlled in a conventional fashion in accordance with a known control policy.

This phenomenon can be explained with reference to FIG. 2, which depicts a simplified representation of damping forces 48 such as might typically be produced the damping means 18 under differing conditions of the relative velocity 50 of members 12, 14 and the absolute velocity 52 of supported member 12, when the damper means is controlled in accordance with the above mentioned standard control policy based upon the sign of the product of the aforesaid velocities. As indicated in FIG. 2, the sign of the relative velocity 50 of members 12, 14 may change much more frequently than the sign of the absolute velocity 52 of member 12, particularly in the case of a vehicular suspension system. The magnitude of the damping force 48 at any given time is a function of the then existing relative velocity 50, the then existing adjusted on/off state of the adjustable valve means 22, and the preselected damping coefficient possessed by the damper when in such state. In accordance with the exemplary standard control policy, and as depicted by the lowermost plot of FIG. 2, during those time intervals B, D, F, H, J, L, N and P, when the product of the relative velocity 50 and absolute velocity 52 is less than zero, i.e., negative or minus, semi-active damper means 18 is caused to be in its low damping state and thus the damping forces 48 are of a preselected low magnitude. The preselected low magnitude may be approximately zero, as illustrated. On the other hand, during those time intervals A, C, E, G, I, K, M and O, when the product of the relative and absolute velocities 50, 52 is greater than zero, i.e., positive or plus, damper means 18 is caused to occupy its high damping state such that it produces significant damping forces 48 that are proportional to the relative velocity 50. Except for time intervals G and O, all of the above mentioned time intervals begin and end when the relative velocity 50 is zero. As a consequence, the damping forces 48 generated within such time intervals have few, if any, discontinuities or abrupt variations. However, in the two time intervals G and O wherein changes in the damping state of damper means 18 result from changes in the sign of absolute velocity 52 rather than from the sign changes of relative velocity 50, abrupt changes in the damping force may and illustratively do occur. As seen in the case of damping force 48 generated at the outset of time interval G, when the control policy dictates that the damper state be switched from low to high due to the change in the sign of the absolute velocity 52 from positive to negative, the relative velocity 50 may then be and is illustratively quite large. Since the magnitude of the damping force 48 is a function of the relative velocity 50, an abrupt and large increase in the damping force 48 occurs at the outset of time interval G. Similarly, at the end of time interval O, when the standard control policy dictates a change in the damping state from high to low due to another change in sign of the absolute velocity 52, damping force 48 undergoes another abrupt change, which illustratively is a sharp decrease. Either or both of these abrupt changes or discontinuities in the damping force 48 may contribute to or produce shock and/or noise of undesirable magnitude in the system 10 with which damper means 18 is associated.

Figure 3:
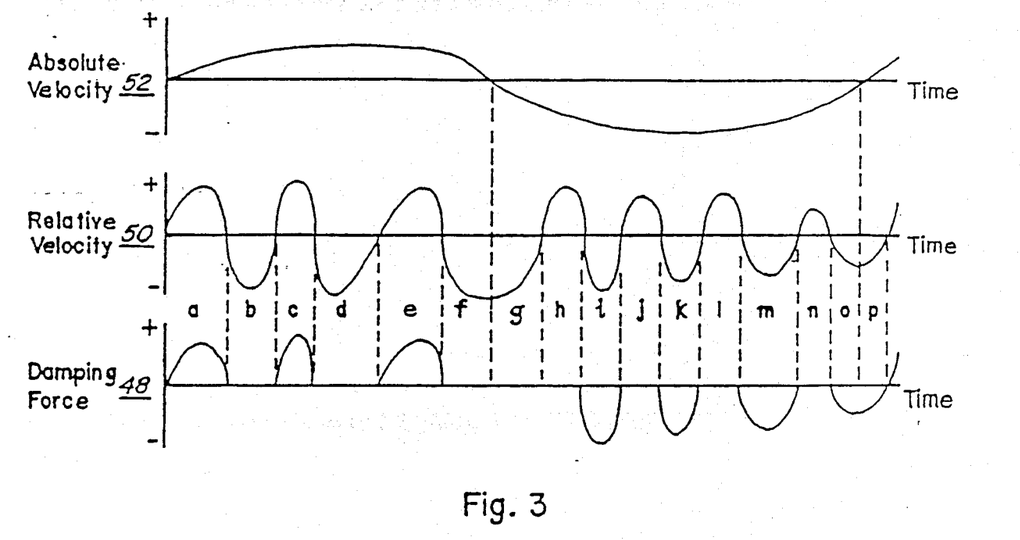
FIG. 3 is a graphic illustration similar to FIG. 2 showing the changed damper forces that ensue when switching of the damper means between its high and low damping states is delayed in accordance with a preferred method of operation and accomplished with the present invention.

The aforesaid of damping force discontinuities as depicted in FIG. 3 may be eliminated by delaying state changes of damper means 18 until the relative velocity 50 is equal to or less than a preselected low magnitude. This low magnitude may be approximately zero. The result is to eliminate abrupt damper force increase and decrease respectively shown previously in FIG. 2 in the time intervals G and O. More specifically, such a "delay" in damper switching as described eliminates substantially all damping force in time interval G, and causes that commenced at the outset of time interval O to continue, rather than abruptly terminating, into and through interval P.

In some instances, adequate shock and noise reduction may be achieved by delaying or deferring only some, rather than all, state changes of damper means 18 until the relative velocity 50 is no greater than the preselected low magnitude. For instance, it may suffice for damper state changes to be delayed only when the change is from the high damping state to the low damping state, or from the low damping state to the high damping state. For example, it has been ascertained that in some applications, the objectionable force impulses or "thumping noise" generated in automobile suspension systems employing semi-active damper means in accordance with a control policy dependent at least in part upon the sign of relative velocity, may be greatly reduced by delaying, until the relative velocity across the damper is of a preselected low or zero magnitude, only those damper states changes from high damping to low damping. Delay of damper state changes from low damping to high damping are believed, in certain applications, to have much less significant or apparent effect upon the noise generation problem.

For example, investigation of the problem of noise generation caused by force impulses in a conventional vehicle suspension system such as that shown schematically in FIG. 1 and which includes a resilient deformable tire member 26, indicates that especially in rigid vehicle structures the problem is noticeably affected by the condition of the resilient tire or other energy storing or releasing compliances in series with the damper. Objectionable noise is likely to ensue when a change in the state of the damper from high to low occurs at a time when the magnitude of the tires' (or other compliant members such as bushings, etc.) compressive deformation, and thus stored energy, is of substantial magnitude. For the purpose of clarification, it is understood that suspension deflection or spring forces in parallel with the damper do not precipitate this problem directly. When in its high damping state, damper means 18 transmits much of the load force of supported suspension member 12 to supporting member 14. This load force, as well as that of member 14, is transmitted via axle 24 to tire 26, as a result of which the tire deforms and stores energy. Change in its damping state from high to low substantially decouples damper means 18, and thus supported suspension member 12, from member 14. Consequently, the tire undergoes rapid return movement toward an equilibrium condition and abruptly transmits a substantial portion of its stored energy via axle 24 to member 12. This causes "bouncing" or oscillation of the vehicle components and accompanying generation of objectionable thumping noise.

As previously noted, one approach to the described problem is to defer switching of damper means 18 from one to the other of its damping states, or at least from its high damping state to its low damping state, until the relative velocity across the damper is no greater than approximately zero or some other preselected low magnitude. Another approach is to defer switching of damper means 18 until the magnitude of the deformation and thus the stored energy of tire 26, and/or of some other deformable energy storing member or members within the system, is no greater than some preselected low magnitude. In the case of tire 26, this can be determined by monitoring the vertical displacement of member 14, either by use of data derived from that produced by acceleration sensor 40 or by use of some other type of sensor (not shown) capable of more directly ascertaining the magnitude of the deformation and/or the stored energy of tire 26.

It is apparent from the above that modifications to the timing and applications of damping force 48 by delay or deferral of switching of damper means 18 until one or both of the above conditions are met so as to reduce force impulse or unloading of compliances can be achieved by modifications to the described standard control policy, or other particular control policy of choice. Input of data from a variety of system motion condition sensors and/or signal processing techniques can be utilized to vary the preselected control policy as executed by control means 38. Methods for the modification of control policies to achieve the desired performance are described in co-pending applications owned by the assignee of record herein.

While the modification of the damping force 48 as described will to some extent degrade the performance of damper means 18, there are factors that lessen such effect. Firstly, no delay of damper switching occurs to alter the performance of damper means 18 at those times when the dictated change in damper state is predicated upon change in sign of the relative velocity 50, rather than a change in sign of absolute 52. As indicated in FIGS. 2 and 3, the relative velocity sign changes are customarily more frequent than absolute velocity sign changes. Further, the time period during which a damper state change is delayed is normally relatively brief; for example, in automobile suspension systems operating under normal conditions, the delay could be expected to be for only 25-50 milliseconds.

As an alternative to a "controls" approach, the above described deferral of damper state transitions to avoid force discontinuities and attendant shock impulses or noise may be accomplished mechanically or "automatically" internal to the structure of adjustable valve means 22. Instead of providing additional sensors to gather system data indicative of relative velocity, energy stored in compliances, vertical displacements and/or additional acceleration signals, which can then be processed or utilized to implement a complex modified control policy, the delay or actuation of damper state changes can be accomplished in conjunction with a standard or simplified control policy with an adjustable valve means 22 of the present invention controlled in part by the fluid pressure differential between variable volume chambers 34 and 34'. The inherent dynamic fluid pressure forces acting on the valve elements can be utilized to delay or defer actuated switching from the high to low and/or low to high damping states, even when commanded to do so by the particular control policy, until the fluid pressure differential between the chambers is at a selected low value. Since the fluid pressure differential is a function of relative velocity, the result is the elimination of undesirable force discontinuities or noise which may be caused by control commanded damper switching at times other than relative velocity zero crossings. This is due to the fact that at such times as when the relative velocity between the supported and supporting members 12, 14 is relatively low or zero, the fluid pressure differential between chambers 34 and 34' is also relatively low or close to zero.

The adjustable valve means of the present invention may also eliminate the need for motion sensing and signal conditioning normally required to effect a damper state transition based on a sign change in relative velocity. As described below, the reversible, "floating" valve rings of the valve means are operable pursuant to dynamic fluid pressure forces and serve to accomplish damper state transition from high to low and low to high damping coefficient upon change in direction of hydraulic fluid flow through the damper. Thus, damper state transitions automatically occur upon change in direction or sign of the relative velocity between members 12, 14 at times when the relative velocity is at or near zero, without an external control policy command or electronic valve actuation. In this manner, the automatic, dynamic fluid pressure controlled adjustable valve means can eliminate the need for relative velocity sensing or signal conditioning to implement damping state transitions at relative velocity sign changes or zero crossings because electromagnetic valve actuation is not required.

Figure 4:
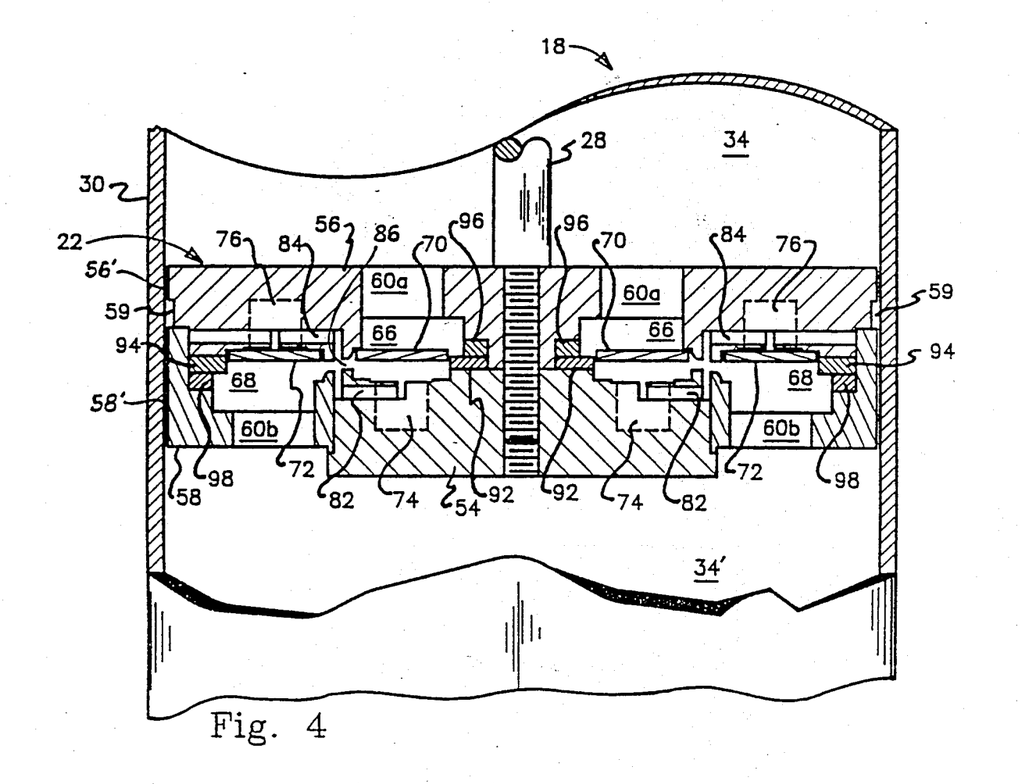
FIG. 4 is a fragmented, partially cross-sectional view of the present invention showing the adjustable valve means within a fluid cylinder.

Referring now to FIG. 4, adjustable valve means 22 of the present invention is configured as a piston operable in extension and compression via rod 28 between variable volume chambers 34 and 34' of damper 18. Rod 28 is threadingly engaged with the piston core 54 through a hole in upper manifold 56 and likewise is connected with one of the supported or supporting members 12, 14. The lower manifold, 58, is connected to or constrained by inner core 54. The outer walls of the piston 56' and 58' are dimensioned to adequately allow for movement within cylinder 30 and may further include within recessed area 59 a resilient fluid seal (not shown) to prevent undesirable leakage between the variable volume chambers. Cylinder 30 is connected mechanically to the other of members 12, 14. The hydraulic flow circuit 36 schematically represented in FIG. 1 may be incorporated within the piston of the damper means, as discussed with reference to FIGS. 4-9.

Figure 5:
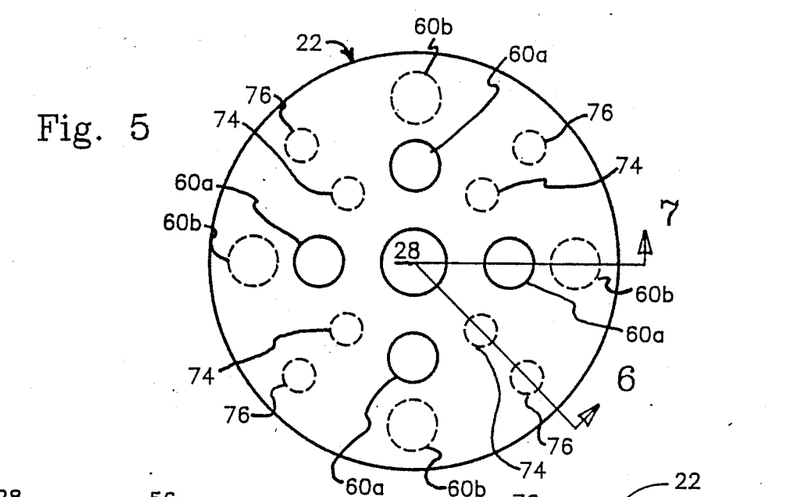
FIG. 5 is a somewhat schematic, overhead plan view of the valve means showing the relative placement of the main flow ports and electromagnets within the piston.
Figure 6:
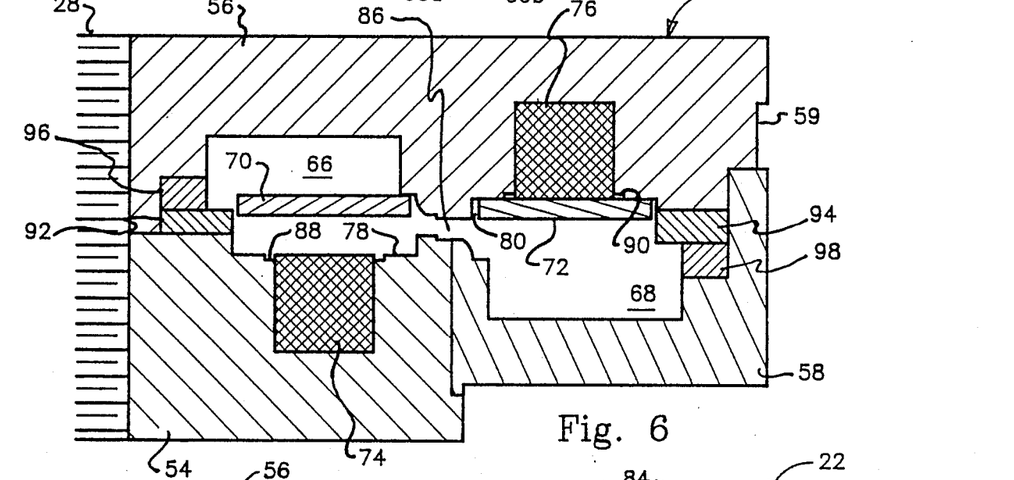
FIG. 6 is a fragmented, somewhat schematic radial half-section view of the adjustable valve means of FIG. 4, taken along line 6 of FIG. 5.

As depicted in FIGS. 4 and 5, a plurality of main flow ports 60a and 60b may be provided for communication of fluid between the variable volume chambers, respectively through upper manifold 56 and lower manifold 58. Flow ports 60a and 60b are respectively offset radially and are interconnected within the piston through annular flow channels 66 and 68. The flow channels 66, 68 are of relatively large volume to provide for movement of the valving elements and fluid pressure interaction therewith. Housed within channels 66, 68 are inner valve ring 70 and outer ring 72, respectively, which are movable between first and second positions to meter the flow of fluid between the flow passages 60a, 60b and hence modulate the damping coefficient of the damper means. A plurality of electromagnets are embedded within the piston for actuating valve ring movement. As seen in FIGS. 4-6, a plurality of inner electromagnets 74 are embedded within core 54 in proximity to annular channel 66. Inner valve ring 70 is contructed of a magnetically conductive metal and upon actuation of the inner electromagnet 74, is attracted in the direction of core 54 to what is designated herein as its "first" position. A plurality of outer electromagnets 76 function similarly with respect to outer valve ring 72 and are embedded within upper manifold 56 in proximity to annular channel 68. Upon actuation of electromagnets 76, the outer valve ring 72 is attracted to its "first" position against upper manifold 56. Electromagnets 74, 76 may be operable between "on" and "off" states, or alternatively between attractive and repulsive states, for selectively releasing and/or imparting forces to valve rings 70, 72. The electromagnets 74, 76 are spaced within the piston between the flow ports (FIG. 5) and thereby avoid interference with the fluid circuitry. Electrical wiring (not shown) may be provided to drive the electromagnets and extend through a longitudinal bore (not shown) in the rod 28 for connection to control means 38 (FIG. 1).

Figure 7:
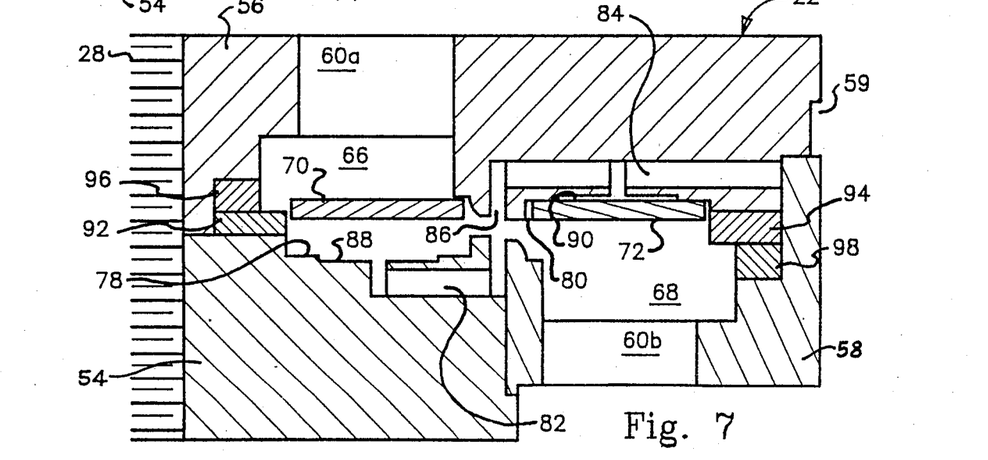
FIG. 7 is a fragmented, somewhat schematic radial half-section view of the adjustable valve means of FIG. 4, taken along line 7 of FIG. 5.
Figure 9:
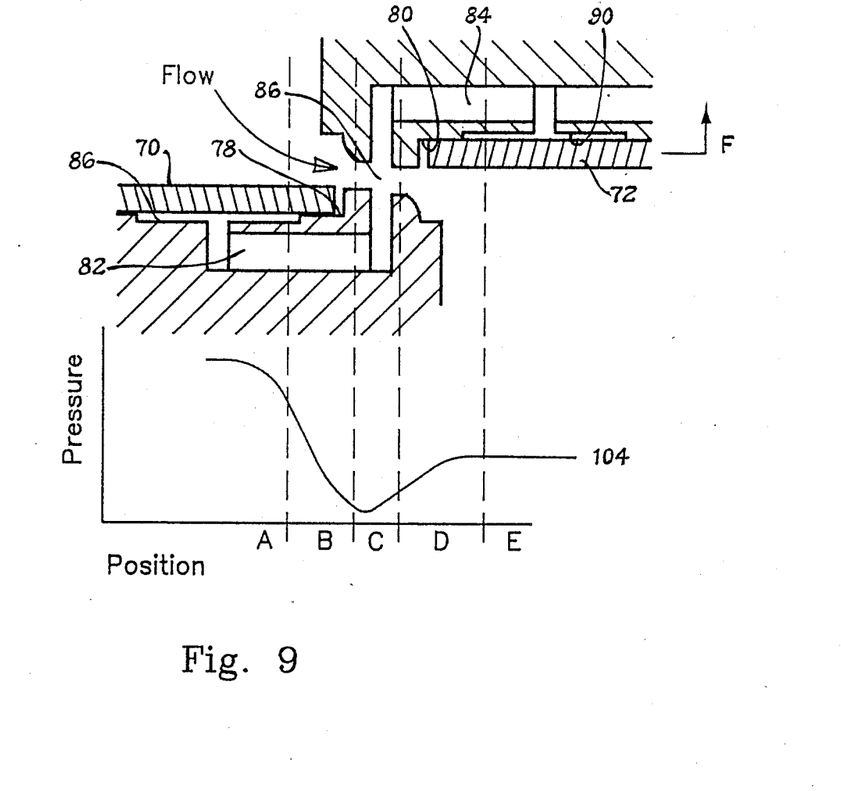

When either or both of valve rings 70, 72 are in their first positions, they are received respectively within portions of annular channels 66, 68 designated as valve seats 78, 80 (FIGS. 6 and 7). Valve seats 78, 80 function to prevent the valve rings from unduly obstructing fluid flow when in their first positions, and also provide for better electromagnetic attraction between the valve rings and electromagnets. An important feature associated with the valve seats for deferral of damping state transition from low damping to high damping are fluid passages 82, 84 (FIGS. 4 and 7). Fluid passages 82, 84 respectively connect valve seats 78, 80 with the fluid flow Region 86 between chambers 66 and 68. The flow passages 82, 84 may be configured as a plurality of bores or alternatively, may be annularly machined into the core 54 and upper manifold 56. Flow channels 82, 84 function to provide a net force holding the valve rings 70, 72 in their first positions during times of high fluid velocity (high relative velocity across the damper) and thereby prevent commanded valve switches from low to high damping until the relative velocity between members 12, 14 is at a preselected low magnitude. The result is to prevent force discontinuities caused by damper state transitions such as that caused by damper state transitions such as that shown in Region G of FIG. 2. Relatively low fluid pressure in passages 82, 84 is the result of rapid fluid flow through Region 86 to provide the net force (FIG. 9). Recessed channels 88, 90 (FIG. 7) formed respectively within valve seats 78, 80 provide additional low pressure fluid surface area with the valve rings 70, 72 to enhance the retaining force and likewise prevent "sticking".

Valve rings 70, 72 during their rapid vertical movement between first and second positions, which occurs during operation of the damper, are laterally confined by valve guides 92, 94. Valve guides 92, 94 (FIGS. 7, 8(a)) function to align the valve rings to prevent their jamming or binding along their path of motion from one of the first or second positions to the other. Valve guides 92, 94 further cooperate with valve rings 70, 72 at times to substantially obstruct fluid flow through the piston. When either of valve rings 70, 72 are in the second, flow restricting position away from their respective valve seats, valve guides 92, 94 in conjunction respectively with valve rings 70, 72 substantially prevent fluid flow through the particular annular flow channel 66 or 68. Valve rings 70, 72 are also compliant to provide a pressure relief function. Under high fluid pressure conditions, either of valve rings 70, 72 in the second flow restricting position may flex at the radial surface adjacent to one of valve guides 92, 94 to permit fluid flow therebetween. Spacers 96 and 98 may be respectively provided to respectively position the valve guides 92, 94 and determine the amount of pressure relief.

Figure 8A:
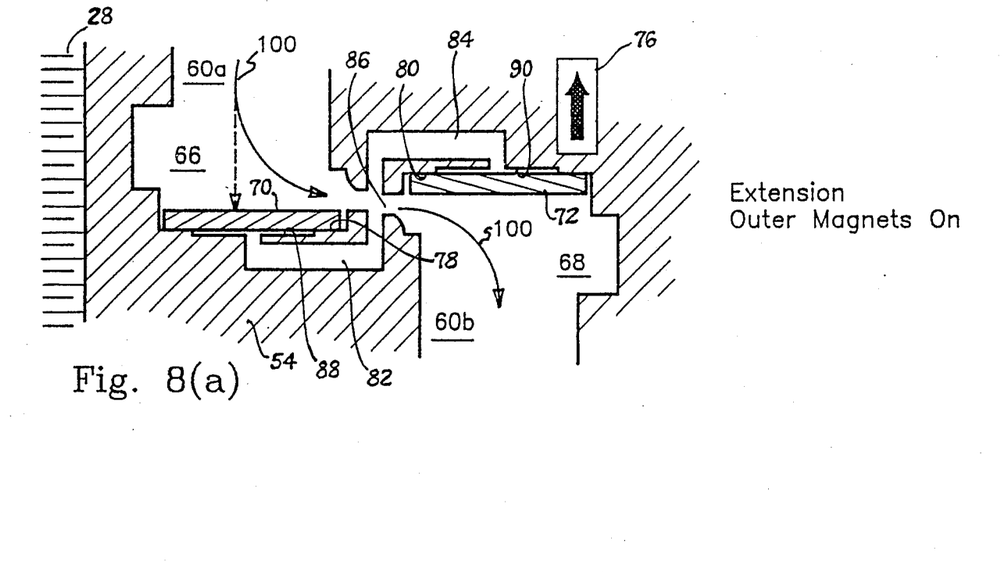

Referring now to FIGS. 8(a)-8(b), the function of valve means 22 during extension and compression of the damper assembly 18 is described in detail. As represented in FIG. 8(a), hydraulic fluid is schematically shown by lines 100 to flow from the upper chamber 34 to lower chamber 34' (FIGS. 1 and 4), such that the damper 18 is operating in extension and the supported and supporting members 12, 14 are moving away from one another. The control means 38 has selected that the outer magnets 76 will be in their "on" state so as to attract the valve ring 72 and retain it in its first position within valve seat 90. Inner magnets 74 are "off" yet inner valve ring 70 is forced by the fluid pressure to remain in its first positions within valve seat 78. Within their respective valve seats, valve rings 70, 72 are clear of annular channels 66, 68 so that fluid is relatively free to flow through flow passages 60a, annular channel 66, Region 86, annular channel 68 and escape through flow passages 60b. Since the inner magnets 74 are "off", inner ring 70 is relatively free to "float" between the first and second positions, dependent only upon the dynamic fluid pressure forces which act upon it. Since during extension the fluid flow is in the direction shown be lines 100, inner valve ring 70 will remain biased in its first position. In this manner, fluid is relatively free to flow between chambers 34 and 34' and low state damping is selected.

Figure 8B:
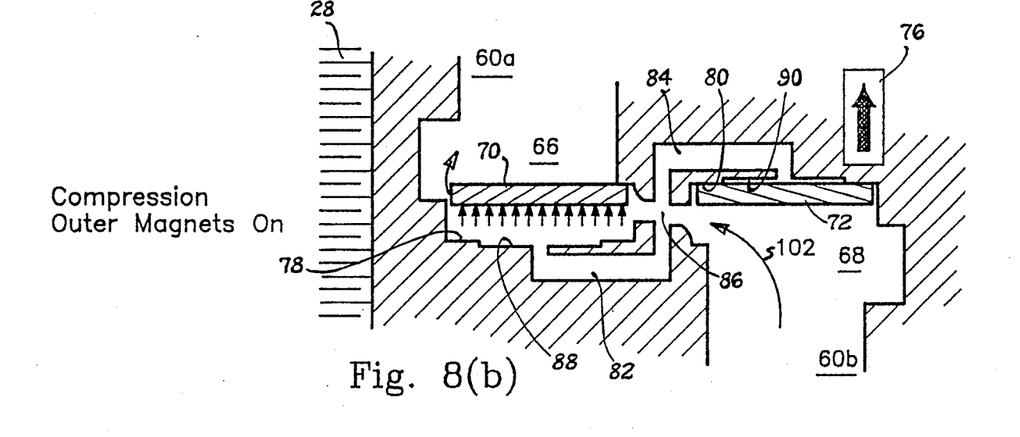

The reversible check valve function provided by the valve rings is shown in FIG. 8(b) in which damping state transition from low damping (relatively unrestricted fluid flow) to high damping (relatively restricted fluid flow) is accomplished without a change in actuation of inner and outer electromagnets 74, 76. When the motion condition of damper means 18 changes from extension to compression such that the supported and supporting members 12, 14 are now moving toward one another (FIG. 1), correspondingly the direction of fluid flow changes and has a tendency to flow from the lower chamber 34' to the upper chamber 34 as represented by fluid flow lines 102 (FIG. 8(b)). The outer electromagnets 76 remain "on" as previously commanded and maintain outer valve ring 72 in its first position. However, the "floating" inner valve ring 70, subsequent to change in the direction of fluid flow, is now biased by the dynamic fluid pressure forces upwardly to its flow restricting, second position. A weak bias spring may be used to counter the force of gravity on the inner ring so that it "floats" properly. A small amount of leakage or pressure relief may be provided between its inner radial surface and valve guide 92. In this manner, high damping is selected automatically without a change in command to the electromagnets.

Valve means 22 also provides automatically for delay in damper state transition from high damping to low damping until the relative velocity across the damper is at a preselected low magnitude. Referring once again to FIG. 8(b), even if the control means 38 commands a switch such that the outer electromagnets 76 would be "off" and inner electromagnets 74 would be "on", inner valve ring 70 would not move from its second position to its first position even though attracted by the inner electromagnet 74, until the fluid pressure differential between the chambers 34, 34' reaches a preselected low magnitude such that the electromagnetic force can overcome the fluid pressure force holding valve ring 70 in the upper, second position. At such time as the fluid pressure differential between the chambers becomes sufficiently low, the commanded damper state transition from high damping to low damping be effected. Note, however, that after such a delay, a transition from compression to extension will cause both rings to move which will maintain high damping. This effect is illustrated in FIG. 3, section p and q.

Valve means 22 will likewise automatically delay or defer a commanded switch from low damping to high damping until the relative velocity between the supported and supporting members 12, 14 (or fluid pressure differential between chambers 34, 34') is at a preselected low value. The automatic switching delay from low damping to high damping is accomplished by the retention of one of inner or outer valve rings 70, 72 within its respective valve seat by the low fluid pressure forces produced in one of channels 82, 84. Assuming for illustrative purposes that damper means 18 is operating in extension (FIG. 1) with inner and outer rings 70, 72 positioned as shown in FIG. 8(a), it can be seen that low damping is selected such that fluid flows relatively freely between chambers 34, 34' with outer magnets 76 commanded to retain outer valve ring 72 in its first position. If the valve means were constructed without flow channel 84, it would be expected that upon a commanded actuation to the "off" state of the outer magnet 76 and "on" state of inner magnet 74, with the system still operating in extension, that outer valve ring 72 would immediately change positions due to the fluid flow forces acting upon it, to its second, flow restricting position. However, the low fluid pressure forces created by flow channel 82 on the upper surface of valve ring 72 serve to retain valve ring 72 in its first position until the fluid pressure differential across the damper is sufficiently low (i.e., the relative velocity between the members becomes lower or changes sign). As seen graphically in FIG. 9, the damper means operating in the low damping state in extension experiences relatively high fluid pressure in annular channel 66 (Region A) and relatively low fluid pressure in annular channel 68 (Region E) as depicted by curve 104. This difference in pressure ordinarily would be sufficient to provide a net force on outer valve ring 72 tending to effect its movement towards its second, flow restricting position. However, the rapid movement of fluid through annular Region 86 produces a relatively low fluid pressure (curve 104, Region C) within passage 84, which is even lower than the fluid pressure within annular chamber 68 (Region E). The result is a net force on the outer valve ring 72 in the upward direction. This force may be enhanced or adjusted depending upon the size of recessed area 90 which determines the fluid pressure surface area with the upper portion of valve ring 72. Therefore, damping state transition from low damping to high damping is automatically deferred, even against a commanded electromagnetic switch, until the fluid pressure differential between the chambers (and thus relative velocity across the damper) is at a preselected low magnitude.

While the function of valve means 22 has been discussed in FIGS. 8(a) and 8(b) under conditions of extension and compression with the outer magnet 76 first operating in its "on" state, the valve means is understood to function in a similar fashion when the magnet states and/or valve ring positions are reversed.

As described, it is apparent that the automatic deferral of damper state transition both from high to low damping and low to high damping provided by valve means 22 will prevent or minimize unwanted noise or shock forces which can be imparted to the system when valve switches are electronically commanded to occur under conditions of high relative velocities between the members 12, 14. Further, the valve means minimizes the necessity for commanded switches of the electromagnets to effect a damper state transition. Upon change in sign of the relative velocity between the members, the valve ring in the "off" state with float between the flow restricting and flow permitting positions depending upon the direction of fluid flow through the piston.

While preferred embodiments of the present invention have been described in detail, they are used in a generic and descriptive sense only and not for purposes of limitation; various modifications, alterations and changes may be made without departing from the spirit and scope of the present invention as defined in the appended claims.

What is claimed is:

1. Semi-active damper means operative between relatively movable members and switchable between relatively high and relatively low damping states, comprising:

fluid cylinder means interconnecting said movable members having opposing variable volume fluid chambers separated by piston means, wherein relative movement in compression and extension of said movable members provides for a fluid pressure differential and flow of fluid through said piston means between said chambers;

fluid passages through said piston means for communication of fluid between said chambers during compression and extension of said movable members as dictated by said high damping and said low damping states;

electromagnetic actuator means within said piston means for selecting said damping state in response to a control condition;

first and second valve rings movable between flow permitting and flow restricting positions within said passages, respectively operable by said electromagnetic actuator means alternatively between on and off states, such that when one of said valve rings is in said on state it is in a flow permitting position, and the other of said valve rings in said off state is fluid pressure actuated between flow restricting and flow permitting positions to select respectively either said high or low damping state;

said other of said valve means in said off state providing a check valve function for automatically switching said damper means from one to the other of its damping states dependent upon the direction of fluid flow between said opposing chambers, upon transition between extension and compression of said movable members;

said other of said valve means in said off state further providing a switching delay function from high to low damping such that when pressure actuated in said fluid restricting position, actuation of said valve means by said electromagnetic actuator means to said on state will be ineffective for transfer of said valve means to said flow permitting position until the fluid pressure differential of fluid flow rate between said chambers is at a preselected low magnitude.

2. The semi-active damper means according to claim 1 further comprising:

valve seats within said passages associated with each of said first and second valve rings for receiving said first and second valve rings when occupying respectively said flow permitting positions;

low pressure tap channels extending from said valve seats to said passages for retaining each of said first and second valve rings in said flow permitting positions at relatively high fluid flow rates through said passages;

said one of said valve means in said on state and in said fluid flow permitting position providing a switching delay function from low to high damping, such that actuation of said valve means by said actuator means to said off state will be ineffective and said valve means will be retained by said low pressure tap channels in said flow permitting position until the fluid pressure differential or flow rate between said chambers is at a preselected low magnitude.

3. The semi-active damper according to claim 2 wherein:

said valve seats are recessed relative to their contact points with said valve rings to increase the low pressure fluid contact surface area with said valve rings in said flow permitting positions.

4. The semi-active damper according to claim 1 wherein:

said passages include pressure relief channels positioned in proximity with said valve rings when in said flow restricting position, such that upon fluid pressure induced flexure of said valve rings, fluid flow is permitted through said pressure relief channels and between said variable volume chambers.

5. The semi-active damper according to claim 4, further comprising:

pressure relief spacer rings for selectively determining the degree of fluid pressure relief.

6. A semi-active damping assembly for attenuating the transmission of energy between relatively movable members switchable between high damping and low damping states in which the damping coefficient thereof is respectively relatively high and relatively low, comprising:

fluid cylinder means including a piston movable in extension and compression therein and defining opposing variable volume fluid chambers;

fluid passage means through said piston for communication of fluid between said opposing chambers during compression and extension as dictated by said high damping and low damping states;

inner and outer valve rings concentrically placed within said piston each movable between flow restricting and flow permitting positions of said flow passage means;

inner electromagnetic actuator means within said piston operable between on and off states, wherein in said on state said inner valve ring is retained electromagnetically in said flow permitting position and said outer valve ring is fluid pressure actuated such that during extension, fluid flow is unrestricted through said passages to produce said low damping state, and in compression said outer valve ring is forced by fluid pressure to said flow restricting position to produce said high damping state;

outer electromagnetic actuator means within said piston operable between on and off states, wherein in said on state said inner valve ring is retained electromagnetically in said flow permitting position and said inner valve ring is fluid pressure actuated such that during compression, fluid flow is unrestricted through said passages to produce said low damping state and in extension, said inner ring is forced by fluid pressure to said flow restricting position to produce said high damping state;

wherein transition from said high damping to said low damping states is automatically deferred by one of said inner and outer valve rings at times when one of said electromagnetic actuators is transferred from on to off, such that said one of said inner and outer valve rings will not switch from its flow restricting position to its flow permitting position until the fluid pressure differential between said opposing chambers is at a preselected low magnitude.

7. The semi-active damping assembly according to claim 6 further comprising:

valve seats within said flow passage means associated with each of said inner and outer valve rings for receiving said inner and outer valve rings when occupying respectively said flow permitting positions;

low pressure tap channels extending from said valve seats to said flow passage means for retaining each of said inner and outer valve rings in said flow permitting positions at relatively high fluid flow rates through said passages;

wherein, transition of said assembly from said low damping state to said high damping state is automatically deferred by said low pressure tap channels associated with each of said inner and outer valve rings, said low pressure tap channels being operable to retain one of said inner or outer valve rings in said flow permitting position subsequent to transition respectively of said inner or outer electromagnetic actuator means from said on to said off state, until the fluid flow rate or pressure differential between said opposing chambers is at a preselected low magnitude.

8. The semi-active damping assembly according to claim 6, wherein:

said flow passage means include an enlarged fluid flow region in proximity to each of said inner and outer valve rings, such that in said flow restricting position, said valve rings at sufficiently high fluid pressure will deform to permit flow of fluid through said enlarged fluid flow region and between said opposing chambers.

9. The semi-active damping assembly according to claim 8, wherein:

said enlarged fluid flow regions include spacing means for selecting the degree of fluid flow restriction therethrough.

10. The semi-active damping assemble according to claim 6 wherein:

either or both of said inner and outer valve rings are magnetized.

11. The semi-active damping assembly according to claim 7 wherein:

either or both of said inner and outer valve means are spring biased.

12. A method of attenuating the transmission of forces between relatively movable members in a semi-active damper means, comprising the steps of:

providing a hydraulic damper assembly between said relatively movable members operable between high damping and low damping states in which the damping coefficient thereof is respectively relatively high and relatively low;

providing control means for selecting one or the other of said damping states in accordance with a control policy dependent at least in part upon the sign, positive or negative, of the relative velocity between said movable members;

providing electromagnetic actuator means responsive to said control means for switching said damper assembly from one to the other of its damping states;

providing valve means operable in response to said control means between said high damping and low damping states wherein said valve means is fluid pressure biased against the switching force of said actuator means from said high damping to said low damping states, and from said low damping to said high damping states, until the fluid pressure differential and/or fluid flow rate across said valve means is at a preselected low magnitude, such that switching of said damping assembly from high damping to low damping and low damping to high damping is automatically delayed until the relative velocity between said members is at a preselected low magnitude; and providing relative velocity switching means wherein said valve means are automatically switchable between damping states upon change in sign of the relative velocity between said movable members automatically and independently of said electromagnetic actuator means.

* * * * *